(12) United States Patent
Bennett

(10) Patent No.: US 8,241,504 B2
(45) Date of Patent: Aug. 14, 2012

(54) FILTER UNITS AND FILTERING METHOD

(76) Inventor: Wayne Bennett, Irma (CA)

( * ) Notice: Subject to any disclaimer, the term of this patent is extended or adjusted under 35 U.S.C. 154(b) by 392 days.

(21) Appl. No.: 12/571,120

(22) Filed: Sep. 30, 2009

(65) Prior Publication Data

US 2010/0078394 A1 Apr. 1, 2010

Related U.S. Application Data

(60) Provisional application No. 61/101,593, filed on Sep. 30, 2008.

(51) Int. Cl.
*B01J 49/00* (2006.01)

(52) U.S. Cl. ........ 210/671; 210/680; 210/264; 210/283; 210/284; 210/924; 210/925

(58) Field of Classification Search ................ 210/671, 210/680, 264, 283, 284, 924–925
See application file for complete search history.

(56) References Cited

U.S. PATENT DOCUMENTS

| | | | | |
|---|---|---|---|---|
| 6,969,469 B1 * | 11/2005 | Xie | .............. | 210/807 |
| 7,156,987 B1 * | 1/2007 | Sanguinetti | .............. | 210/164 |
| 7,658,857 B2 * | 2/2010 | Wacome | .............. | 210/747.3 |
| 7,666,306 B2 * | 2/2010 | Fukuda et al. | .............. | 210/660 |
| 2003/0111431 A1 * | 6/2003 | Dew, Jr. | .............. | 210/807 |
| 2008/0210637 A1 * | 9/2008 | Fukuda et al. | .............. | 210/708 |

OTHER PUBLICATIONS

McGee, T., "Make a Water Filter From Old Tires," Treehugger.com, Nov. 21, 2006, <http://www.treehugger.com/files/2006/11/water_filter_fr.php> [retrieved Sep. 28, 2009], 1 page.

"Scrap Tires Can Be Used to Filter Wastewater," Penn State live, Nov. 17, 2006, <http://live.psu.edu/story/20894> [retrieved Apr. 7, 2010], 2 pages.

Tang, Z., et al., "Enhanced Performance of Crumb Rubber Filtration for Ballast Water Treatment," Chemosphere 74(10):1396-1399, Mar. 2009.

Xie, Y., et al., "Crumb Rubber for Wastewater Filtration," Filtration+Separation.com, Mar. 23, 2009 <http://www.filtsep.com/view/839/crumb-rubber-for-wastewater-filtration> [retrieved Sep. 9, 2009], pp. 1-4.

Xie, Y., et al., "Using Crumb Rubber Filtraton for Ballast Water Treatment," Report for Research Project No. 2003PA11B, Pennsylvania Water Resources Research Center, Feb. 2004, 5 pages.

* cited by examiner

*Primary Examiner* — Chester Barry
(74) *Attorney, Agent, or Firm* — Christensen, O'Connor, Johnson, Kindness, PLLC

(57) ABSTRACT

A filter unit includes a flexible bag having permeable material on a first side and a second side that allows fluid to pass through the container. Granularized rubber is enclosed within the flexible bag. The granularized rubber filters hydrocarbon products from the fluid.

16 Claims, 6 Drawing Sheets

FILTER UNITS AND FILTERING METHOD

FIELD

This relates to filter units for filtering hydrocarbons from fluid.

BACKGROUND

When fluids such as water become contaminated with hydrocarbons, it is necessary to clean them before disposing of the water to prevent environmental damage.

SUMMARY

There is provided a filter unit, comprising a flexible bag having permeable material on a first side and a second side that allows fluid to pass through the container, and granularized rubber enclosed within the flexible bag, the granularized rubber filtering hydrocarbon products from the fluid.

There is also provided a filter for filtering water contaminated with hydrocarbons, comprising a housing having a fluid inlet, a fluid outlet, and a flow path connecting the fluid inlet to the fluid outlet. One or more filter units is positioned in the flow path such that water flowing between the fluid inlet and the fluid outlet passes through each filter unit.

There is also provided a ground protection pad, comprising more than one filter unit. Each filter unit is attached to at least one adjacent filter unit by an attachment such that the filter units filter hydrocarbons from fluid containing hydrocarbons that flows onto the filter units and water from the fluid passes through the filter units.

There is also provided a method of filtering fluid, comprising the steps of: providing at least one filter unit having a reclosable opening for removing and replacing the granularized rubber; positioning the at least one filter unit to filter fluids containing hydrocarbons; and replacing the granularized rubber containing hydrocarbons with clean granularized rubber via the reclosable opening.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
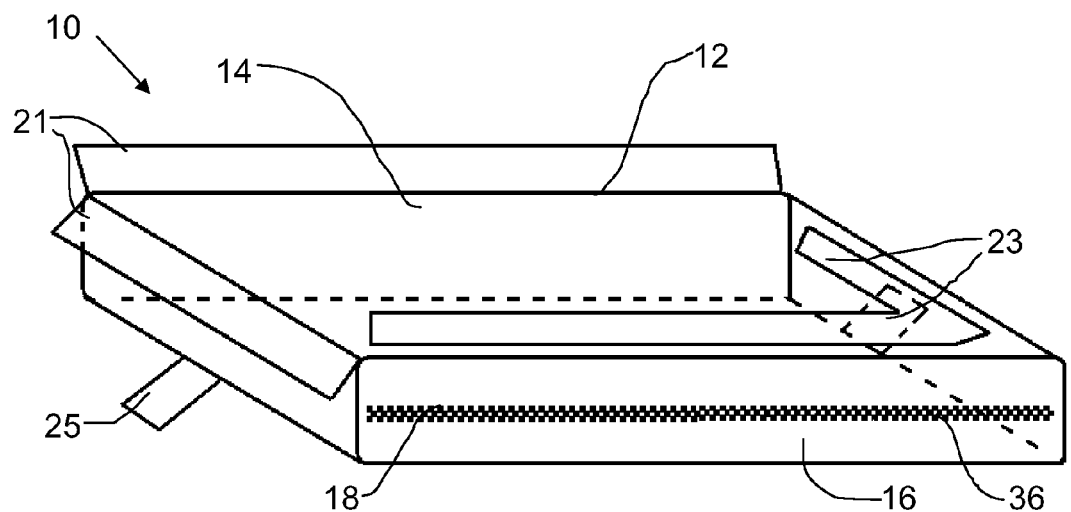
FIG. 1 is a partially transparent perspective view of a filter unit.

A filter unit generally identified by reference numeral 10, will now be described with reference to FIG. 1 through 10.

Figure 7:
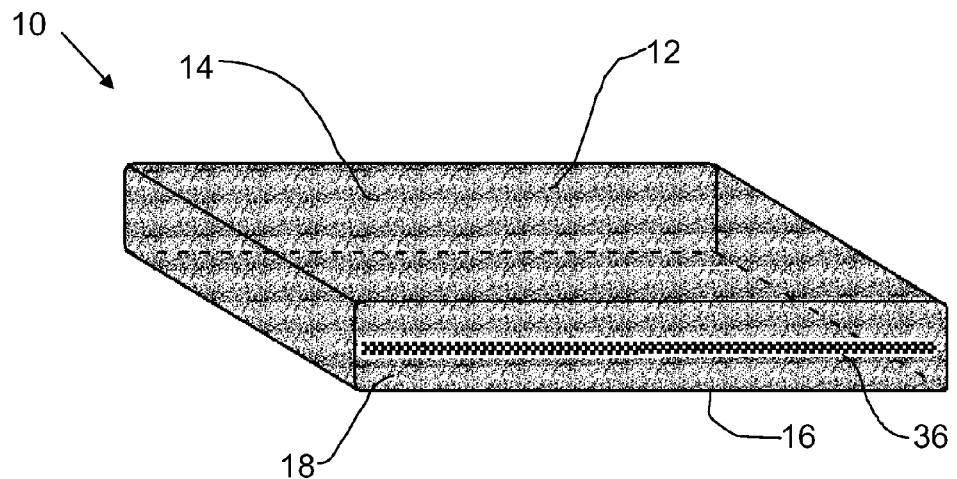
FIG. 7 is a transparent perspective view of a filter unit.
Figure 8:
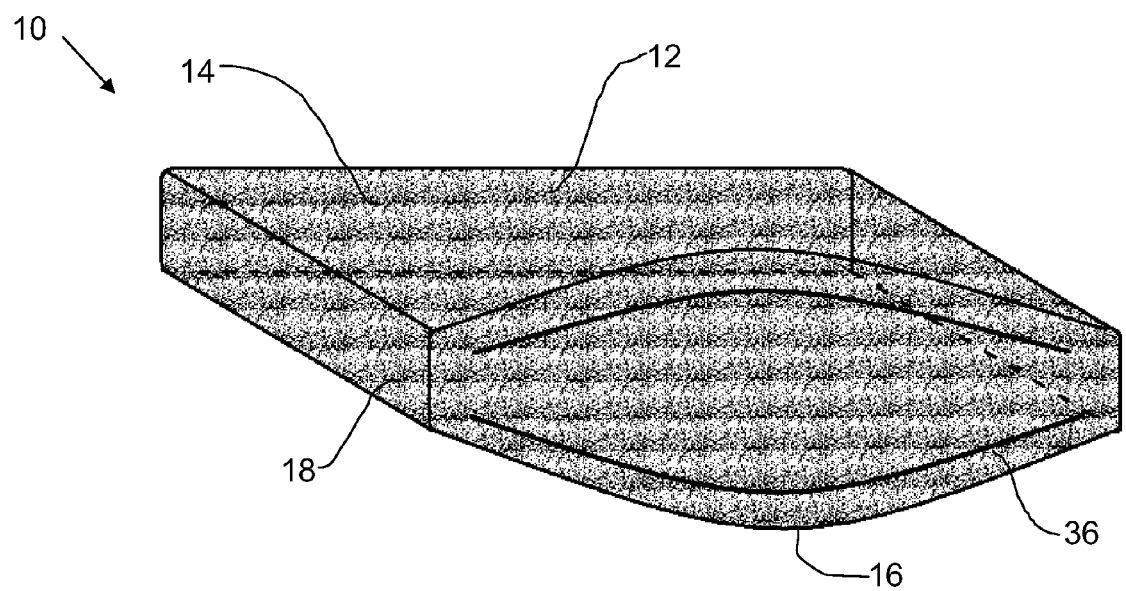
FIG. 8 is a transparent perspective view of an opened filter unit.

Structure and Relationship of Parts:

Referring to FIG. 1, filter unit 10, also referred to as a filter bag, may be made from a flexible material 12 formed into a bag structure. Flexible material 12 is at least partially made from permeable material that allows fluid to pass through the container. For example, top 14 and bottom 16 may be permeable, while side edges 18 are not, or only a portion of top 14 and bottom 16 are permeable, or the entire bag 12 may be permeable. Referring to FIGS. 7 and 8, flexible bag 12 encloses or contains granularized rubber 20. Granularized rubber 20 is used to filter hydrocarbon products from the fluid that passes through bag 12. For example, granularized rubber 20 may be from recycled tires, and preferably contains fiber in addition to the granularized rubber. The permeable material may be a mesh made from natural or synthetic materials, or may be a material that is sufficiently permeable to allow the necessary fluid flow rate to prevent puddling on filter unit 10. The permeability will depend on the anticipated flow rate. If a mesh is used, the mesh size must be sufficiently small to prevent granularized rubber 20 from escaping, which will depend on the size of granularized rubber 20.

Filter units 10 may be used in various ways. Two general uses are depicted in the drawings. Referring to FIG. 1 through 6, filter units 10 may be formed into a ground protection pad 22, and referring to FIGS. 9 and 10, filter units 10 may be inserted into a filter housing, such as a vertical housing 24 shown in FIG. 9, or a horizontal housing 26 shown in FIG. 10.

Figure 2:
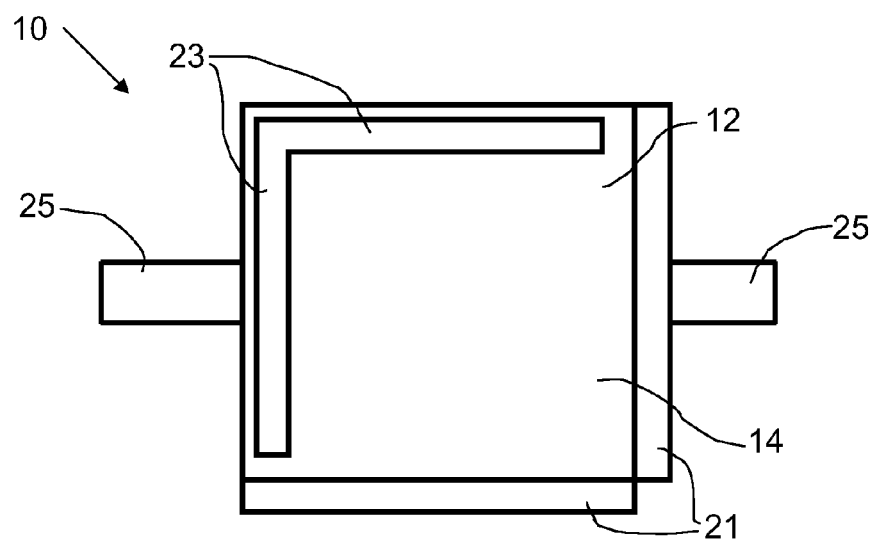
FIG. 2 is a top plan view of a filter unit.
Figure 3:
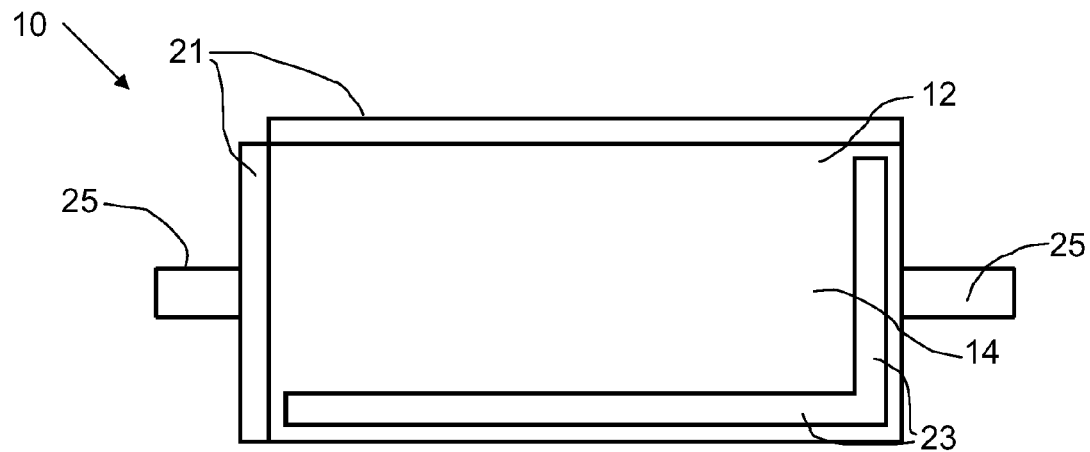
FIG. 3 is a top plan view of a filter unit of a different size and shape.
Figure 4:
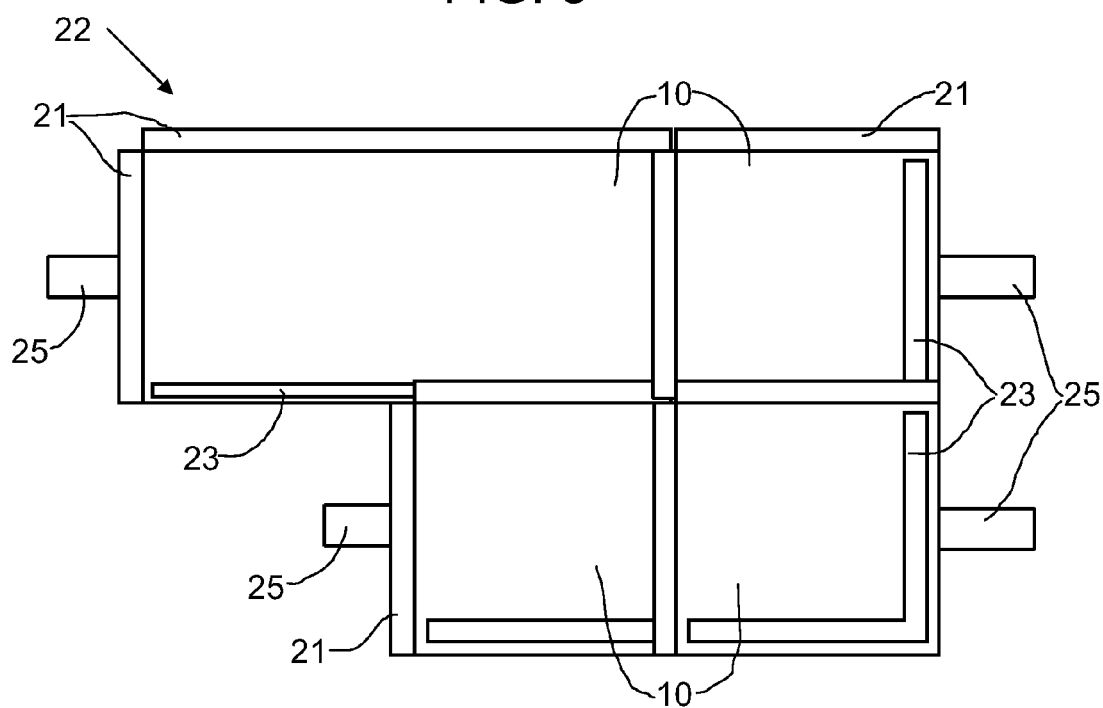
FIG. 4 is a top plan view of a ground protection pad formed from filter units.
Figure 5:
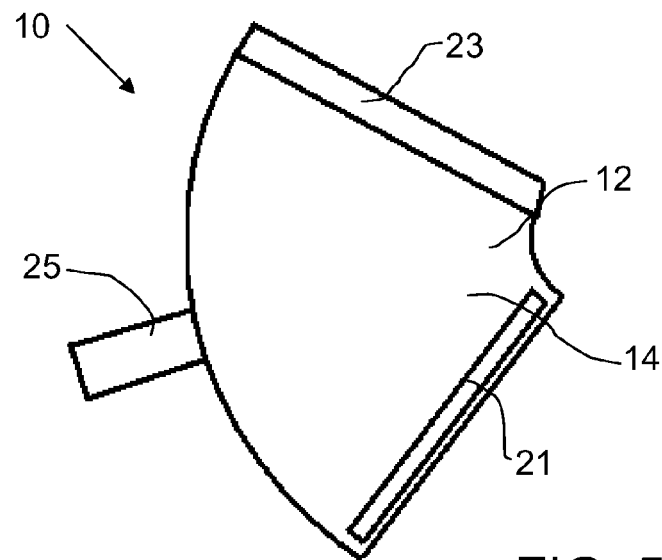
FIG. 5 is a top plan view of a pie-shaped filter unit.
Figure 6:
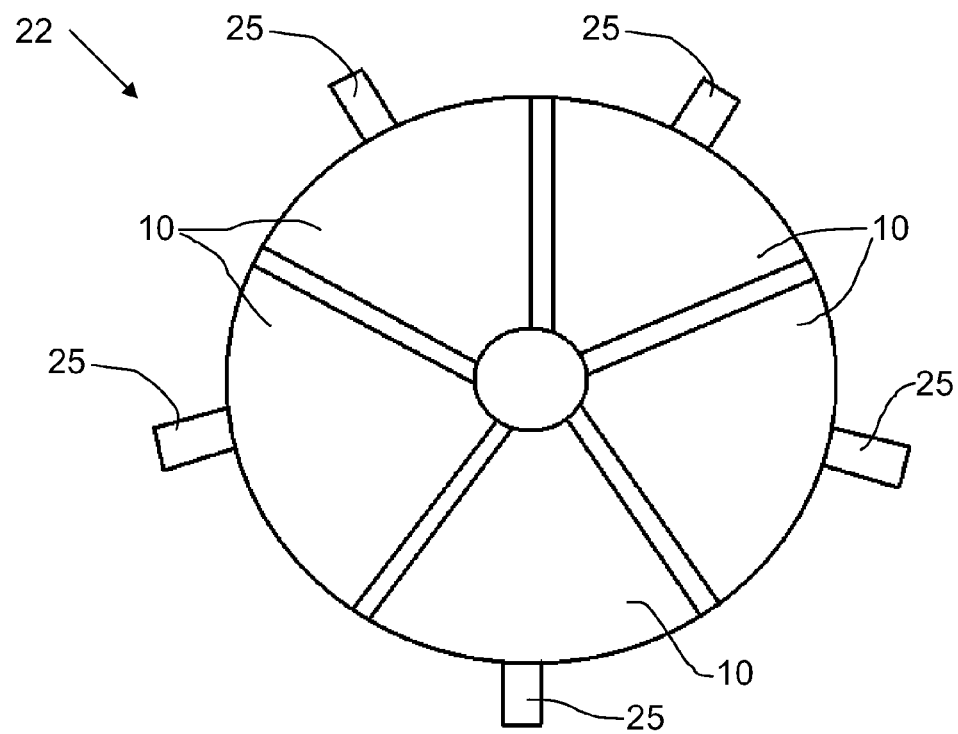
FIG. 6 is a top plan view of a ground protection pad use to surround a wellhead.

Referring to FIGS. 2, 3 and 5, filter units 10 are preferably provided in a variety of shapes. Referring to FIGS. 4 and 6, this allows them to form ground protection pads 22 that can be customized to a desired shape, and may be designed to conform to certain objects, such as a wellhead, referring to FIG. 6. While only a few shapes are shown, it will be apparent from these that filter units 10 may take various shapes, depending on the spaces to be covered, or the objects to be conformed to. Adjacent units 10 are preferably connected together using a releasable attachment, such as a hook and loop connection. As depicted, one part of the connection is on an overlapping flap 21 on top 14 of filter unit 10, and is designed to connect to a second part of the connection as a strip 23 on top 14 of filter unit 10. This design has the advantage of using flaps 21, preferably impermeable, to prevent fluids from flowing between the sides of adjacent filter units 10, such that fluids pass through filter units 10 prior to reaching the ground surface. Additional attachments, such as tabs 25, may be positioned on bottom 16 of filter units 10 to provide a more stable structure. Alternatively, tabs 25 may serve as grips for manipulating filter units 10. Once configured and positioned on a ground surface, ground protection pads 22 capture hydrocarbons and other contaminants as they pass through filter units 10, while water is permitted to flow through units 10. As filter units 10 only collect fluids that need to be collecting instead of collecting all fluids, their effectiveness is prolonged. Referring to FIGS. 6 and 7, as filter units 10 become saturated, rubber 20 may be removed by opening filter unit 10, such as by a zipper 36 or other reclosable opening, cleaned and repacked prior to units 10 being reused. Alternatively, rubber may be replaced with new, clean rubber.

Figure 9:
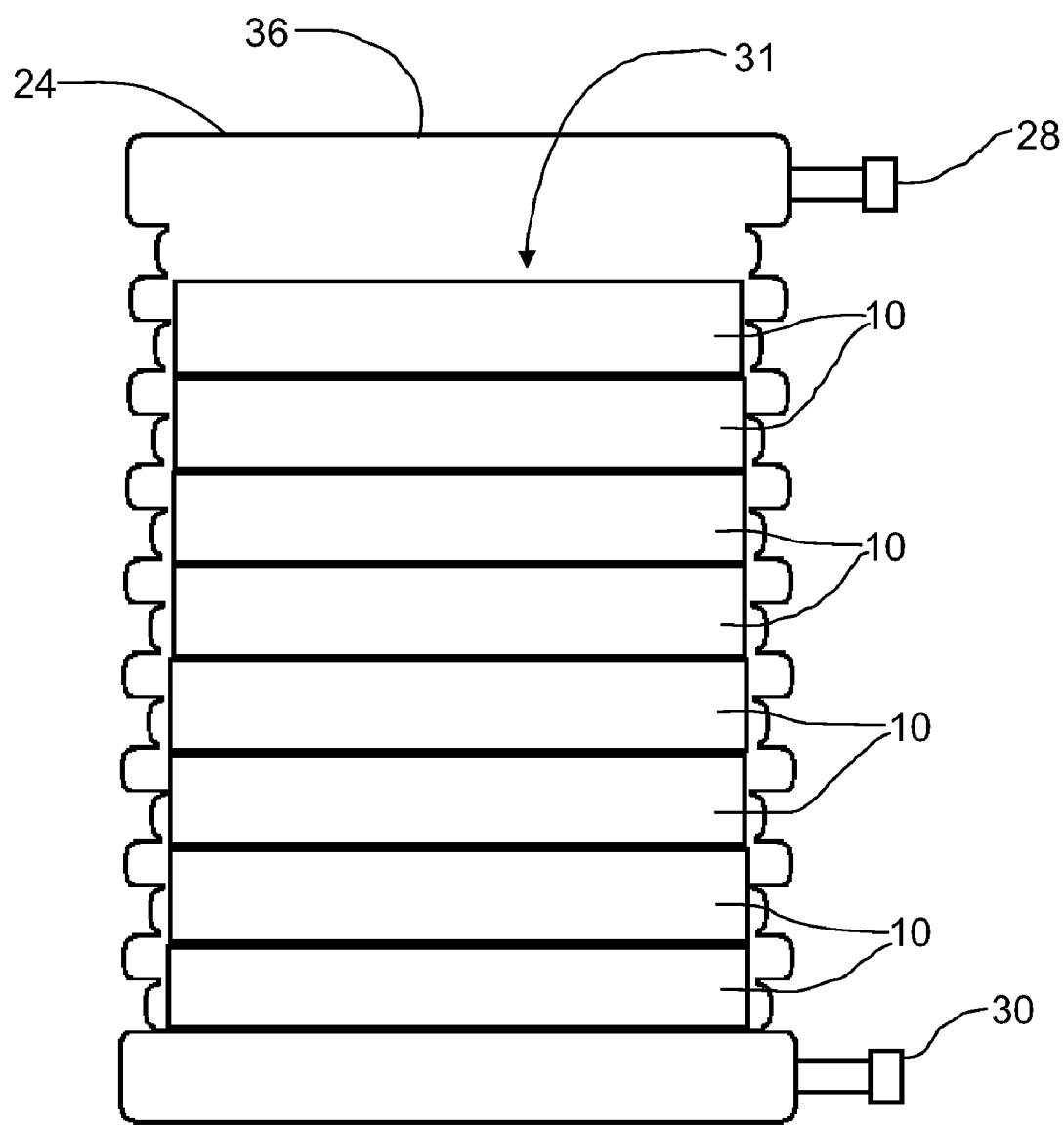
FIG. 9 is a side elevation view in section of an upstanding filter housing containing filter units.
Figure 10:
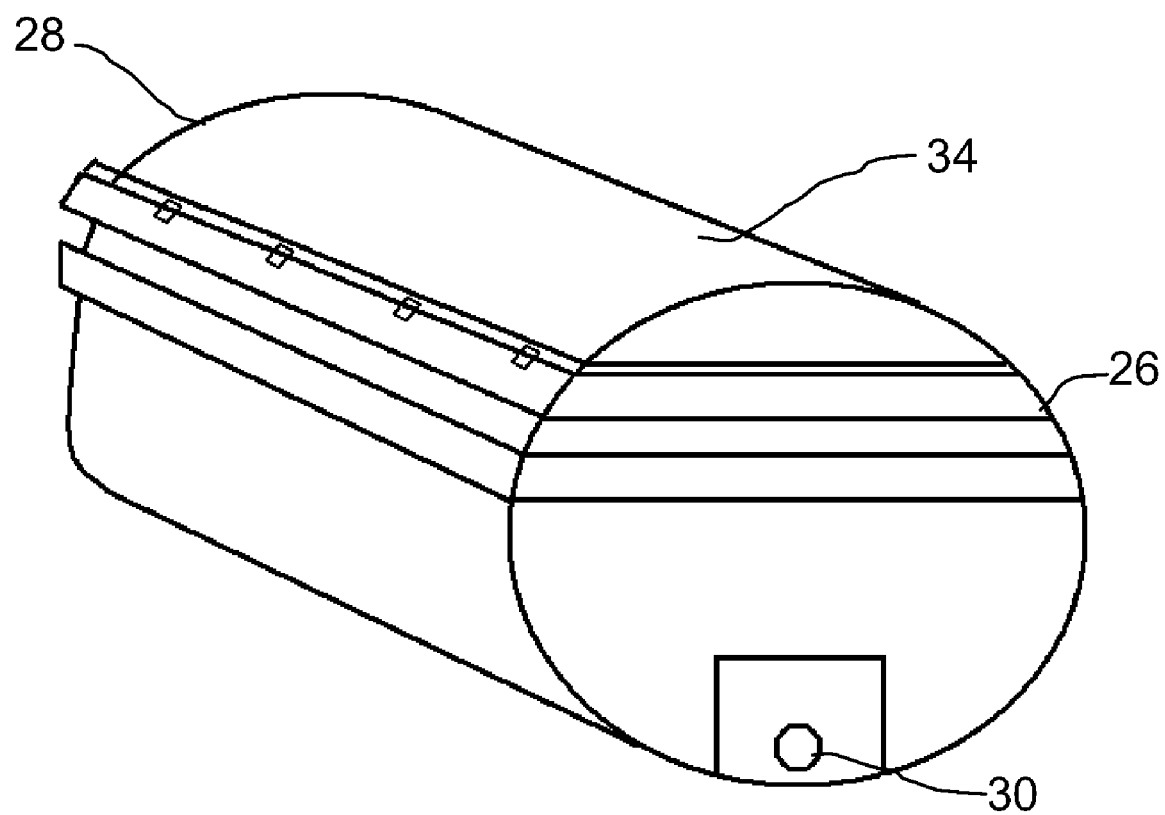
FIG. 10 is a perspective view of a horizontal filter housing.

Referring to FIG. 9, filter bags 10 are placed within a housing 24 that has a fluid input 28 and a fluid output 30, with a fluid path 31 defined between input 28 and output 30. Filter units 10 are preferably sufficiently large and engage the sides of housing 24 to prevent fluids from flowing down the outside of filter units 10 and flow through filter units 10 instead. Referring to FIG. 10, filter units 10 may also be positioned in a horizontally disposed housing 26. While not shown, filter units 10 may be held on edge by a rack with a series of slots to hold units 10. Other strategies and housing designs will be recognized by those skilled in the art. Once the bags are saturated or otherwise need to be replaced or serviced, they are removed such as from the top 32 of filter housing 26 shown in FIG. 9 or through a door 34 of filter housing 28 shown in FIG. 10, and replaced in a similar manner. Once removed, saturated bags 10 are opened, the contents removed through a re-closable opening, such as a zipper 36, cleaned and bags 10 are repacked for reuse. This cleaning and repacking process also applies to filter units 10 used in ground protection pads 22.

Operation:

A method of filtering fluid using filter units 10 includes and packing rubber 20 into filter unit 10 through the opening, which is shown to be a zipper opening 36. Filter units 10 are then deployed, either in a filter housing 24 or 26 as shown in FIGS. 9 and 10, or as a ground protection pad 22 as shown in FIG. 4 or 6. If deployed as a ground protection pad 22, filter units 10 are attached using flaps 21 and strips 23 of the two-part connectors to seal the edges to the other units 10. The appropriate size and shape of filter units 10 are selected to sufficiently cover the ground that needs protecting. If necessary, filter units 10 may be reconfigured as the protection requirements change. Once filter units 10 are saturated, or otherwise require servicing, filter units 10 are retrieve, and, referring to FIGS. 7 and 8, opening 36 is opened to remove and replace rubber 20. As rubber 20 may be cleaned from the hydrocarbon contamination, rubber 20 may be subsequently reused.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following statements are to be understood to include what is specifically illustrated and described above, what is conceptually equivalent, and what can be obviously substituted. Those skilled in the art will appreciate that various adaptations and modifications of the described embodiments can be configured without departing from the scope of the statements. The illustrated embodiments have been set forth only as examples and should not be taken as limiting the invention. It is to be understood that, within the scope of the following statements, the invention may be practiced other than as specifically illustrated and described.

What is claimed is:

1. A filter unit, comprising:
   a flexible bag having permeable material on a first side and a second side that allows fluid to pass through the flexible bag;
   granularized rubber enclosed within the flexible bag, the granularized rubber filtering hydrocarbon products from the fluid; and
   a fastener for fastening to an adjacent filter unit.

2. The filter unit of claim 1, wherein the granularized rubber comprises fibres from recycled tires.

3. The filter unit of claim 1, wherein the flexible bag comprises a reclosable opening for removing and replacing the granularized rubber.

4. The filter unit of claim 1, wherein the fastener extends along a top edge of the flexible bag such that fluids are prevented from flowing between the filter units.

5. A ground protection pad, comprising:
   more than one filter unit, each filter unit comprising:
      a flexible bag having permeable material on a first side and a second side that allows fluid to pass through the container;
      granularized rubber enclosed within the flexible bag, the granularized rubber filtering hydrocarbon products from the fluid; and
      a releaseable fastener for attaching to an adjacent filter unit;
   at least one filter unit being attached to at least one adjacent filter unit by an attachment such that the filter units filter hydrocarbons from fluid containing hydrocarbons that flows onto the filter units and water from the fluid passes through the filter units.

6. The ground protection pad of claim 5, wherein the more than one filter units define an opening for a wellhead when attached.

7. The ground protection pad of claim 5, wherein the releasable fastener extends along a top edge of the flexible bag such that fluids are prevented from flowing between the filter units.

8. The ground protection pad of claim 5, wherein the filter units are reconfigurable such that the shape of the ground protection pad is adjustable.

9. The ground protection pad of claim 5, wherein the granularized rubber comprises fibres from recycled tires.

10. The ground protection pad of claim 5, wherein the flexible bag comprises a reclosable opening for removing and replacing the granularized rubber.

11. A method of filtering fluid, comprising the steps of:
    providing more than one filter unit, each filter unit comprising:
       a flexible bag having permeable material on a first side and a second side that allows fluid to pass through the flexible bag;
       granularized rubber enclosed within the flexible bag, the granularized rubber filtering hydrocarbon products from the fluid; and
       a reclosable opening for removing and replacing the granularized rubber;
    positioning the more than one filter unit to filter fluids containing hydrocarbons;
    attaching more than one filter unit to form a ground protection pad; and
    replacing the granularized rubber containing hydrocarbons with clean granularized rubber via the reclosable opening.

12. The method of claim 11, wherein the granularized rubber comprises fibres from recycled tires.

13. The method of claim 11, further comprising the step of cleaning the granularized rubber containing hydrocarbons to obtain the clean granularized rubber.

14. The method of claim 11, wherein positioning the filter unit to filter fluids comprises positioning the filter units in a filter housing.

15. The method of claim 11, wherein the more than one filter units comprise filter units of two or more different shapes or sizes.

16. The method of claim 11, wherein the ground protection pad defines an opening for a wellhead.

\* \* \* \* \*